Patented Oct. 28, 1941

2,260,757

UNITED STATES PATENT OFFICE 2,260,757

COMPOSITION AND PROCESS FOR TREATING EMULSIONS

Claudius H. M. Roberts, San Marino, and Richard Vernon Niswander, Long Beach, Calif., assignors to Petrolite Corporation, Ltd., Wilmington, Del., a corporation of Delaware No Drawing. Application May 29, 1939, Serial No. 276,446

9 Claims. (Cl. 252—335)

This invention relates to a composition and process for treating emulsions and, more particularly, water-continuous emulsions of relatively low oil content, such as ballast water.

After the fuel oil contained in the storage tanks of an oil-burning vessel is consumed, it is customary to pump sea water into these tanks for ballast purposes. The rolling of the ship churns up the sea water and the residual fuel oil remaining in the bottom and sides of the tanks, thus forming an emulsion. Before a ship comes into harbor to take on fuel oil, as much of the ballast water as possible is discharged into the ocean. It is usually necessary to carry some ballast water, however, in at least a portion of the fuel tanks when entering the harbor. Government regulations prohibit the discharge of such an emulsion into harbor water unless the oil content thereof is extremely small and, in some instances, it is required that the water contain less than 17 parts of oil per million parts of water.

Certain of these emulsions do not readily separate and various forms of separators of the gravity type have been developed. However, the only satisfactory and efficient separator at present available for fuel oils ranging in gravity from 6½° A. P. I. to 15° A. P. I. is that disclosed in the United States Patent No. 2,047,989, issued to William Woelflin.

This patent may be referred to for a detailed discussion of the process therein-disclosed, but it may be stated here that, broadly, the process comprehends the introduction of gas into the emulsion, the gas moving therethrough and becoming associated with the oil droplets which are dispersed throughout the water, thus acting to move this oil phase toward one end of the chamber from which it can be removed, the other aqueous phase flowing into or remaining in the other end of the chamber so that it can be withdrawn therefrom. Provision is also made for the separate withdrawal of gas from the chamber.

It will be understood that the ballast water is in reality an emulsion of the oil-in-water type. When a gas is bubbled through this emulsion, it has been found that the gas becomes associated with the oil droplets, carrying these oil droplets into the upper part of the chamber. With certain types of emulsions undergoing treatment, the separation is relatively complete. With other type of emulsions, however, it has been found that the phase which becomes associated with the gas does not separate in the form of a substantially homogeneous liquid but is rather in the form of an emulsion. Usually, the oil separates in the form of an oil-continuous emulsion having dispersed therein a small amount of water, while the bulk of the aqueous phase is sufficiently freed from oil that it is suitable for discharge directly into harbor water. If desired, the separated oil-continuous emulsion may be further treated to free it from water, or it may be burned as fuel if the water content is below 12-15%, or it may be stored for subsequent discharge at sea, the volume of such oil-continuous emulsion being greatly less than that of the original water-continuous emulsion.

The cited patent also discloses that the sweeping action of the gas bubbles on the dispersed oil droplets, whereby the latter are swept upward from the main body of water, can be materially increased by the use of suitable chemicals, particularly deemulsifying agents adapted to break water-in-oil type emulsions, suitably alkali-metal soaps such as sodium oleate. Upon the addition of such chemical, for example sodium oleate, a reaction takes place with the alkaline earth constituents which are present in the sea water to form alkaline earth soaps which, in their nascent hydrated form, are dispersed in the water or collect at the interfaces between the water and gas and/or oil, and which apparently serve to facilitate the adhesion of the oil particles with the gas droplets.

It is an object of the present invention to provide an improved and highly efficient composition of matter suitable for addition to a water-continuous emulsion, such as ballast water, to facilitate the sweeping action of introduced gas bubbles on the dispersed oil particles.

In accordance with this invention, we attain the above and other objects by the use of a compound mixture comprising soaps of simple fatty acids in combination with soaps of modified fatty acids, particularly sulphonated acids. We have discovered that such compound mixtures give results which are remarkably better than can be obtained by the separate use of the constituents and better than could be inferred or predicted from the known potency of the constituents acting alone.

Our improved compound consists of a mixture, in suitable proportions, of a simple soap, for example sodium oleate, and a soap of a modified, preferably a sulphonated, fatty acid, for example ammonium soap of sulphonated or sulphated castor oil, made miscible, homogeneous, and liquid by the addition of suitable diluents, for example water, denatured alcohol, and secondary butyl alcohol. The relative proportions of the two active ingredients may vary between the limits of about 5 to 1 and 1 to 5, while the proportions of solubilizing diluents may vary between about ½ to 4 times the total of the saponified constituents. A highly effective compound was produced by mixing the following components, using approximately the proportions stated:

| | Volumes |
|---|---|
| Sodium oleate | 1 |
| Sodium soap of sulphonated castor oil | ½ |
| Denatured alcohol | 1 |
| Secondary butyl alcohol | ¼ |
| Water | 3½ |

Another very effective compound consists of the following components:

| | Volumes |
|---|---|
| Sodium oleate | 1 |
| Ammonium soap of sulphonated castor oil | 1/16 |
| Denatured alcohol | 1 |
| Secondary butyl alcohol | 1/16 |
| Water | 3⅓ |

Other highly effective compounds have been made using ammonium or potassium soaps instead of sodium oleate, or sodium or potassium soaps of sulphonated castor oil instead of the ammonium soap of that material. In general, the soaps may be formed from any of the alkali-metal bases, including ammonium.

Instead of mixing the finished soaps together and adding the solubilizing diluents, we have also made equally effective compounds in the following manner. The unneutralized washed product resulting from sulphonation of castor oil is mixed with the proper quantities of oleic acid and diluents, and the mixture saponified with an aqueous solution of ammonia, caustic soda, or caustic potash. The degree of saponification is apparently not critical, although substantially complete saponification is desirable. Similarly, a slight excess of alkali is not objectionable.

The quantities and kinds of diluents employed are not critical factors except as they affect the homogeneity and ease of use of the product. Since the compound is to be used in a system in which water is the external phase, the compound should be water-soluble or at least water-dispersible. Since fresh water supplies are not usually available for mixing the compound at the point of use, it is preferably diluted at the time of manufacture so that it can be used directly, the dilution being sufficient to favor quick and ready diffusion of the compound into the ballast water so that its utilization will be efficient. As a rule, water alone is not an efficient diluent for this purpose because of separation of the active components of the compound and because of jelling at the concentrations employed. Admixture of the compound with alcohol prevents these defects and also serves to decrease the viscosity of the mixture, keep it homogeneous, and prevent freezing and separation at low temperatures. Water-soluble solvents and diluents other than alcohols may also be used to advantage, if desired.

When soft fresh water is available for making solutions, the mixture of soaps may be advantageously dissolved therein to form a dilute solution of from 1-10% concentration. Such a dilute solution is extremely efficient for treating purposes since it affords close control of the quantity of compound used and the most favorable conditions for uniform mixing with the ballast water emulsion. When used in dilute aqueous solution in this manner, the compound may be used with or without prior admixture of the solubilizing diluents previously discussed.

Our compound may be variously added to the ballast water. For example, it may be added in measured proportions to the stream of ballast water being conducted to the blowing chamber, or it may be injected at various points in the blowing chamber. In practice, the quantity of compound best used may be determined by varying the proportion until suitable clarification is obtained. While the quantities best suited for use will vary according to the character of the ballast water and kind, concentration, and degree of dispersion of the oil dispersed therein, in one instance we found that excellent results were obtained on ballast water containing from 1000 to 3000 parts per million parts of oil by using our compound in the ratio of 1 part of compound to from 1000 to 10,000 parts of oily ballast water. In another instance, oily ballast water containing from 0.5 to 5.0% of oil was very successfully treated by using the compound in the ratio of 1 part to from 5000 to 10,000 parts of oily ballast water.

This served to bring the oil content of the treated water well within the prescribed limits of 15 parts per million.

When the ballast water modified by the action of our compound is blown with air or other gas in such manner as to disseminate a large number of upwardly rising gas bubbles throughout the ballast water, the oil particles become rapidly associated with the gas bubbles and are carried to the top of the blowing chamber. The water is thus quickly and efficiently swept free of oil and may be discharged directly into the harbor water. The process may be practiced either as a batch process or as a continuous process, and apparatus suitable for the practice of the process is illustrated in U. S. Patent No. 2,047,989, above-referred to.

In general, our compound works best in connection with hard water, such as sea water, and apparently depends for its full efficiency upon the formation of alkaline earth soaps from a reaction between the added soaps and the alkaline earth compounds in the sea water. When it is desired to subject a fresh water emulsion to this process, it is advisable to add calcium chloride or similar alkaline earth soluble salts to the water in order to provide for the formation of the alkaline earth soaps.

In general, we can use any simple fatty acid soap in combination with any modified fatty acid soap. The class of simple fatty acid soaps has been illustrated in the above examples by sodium oleate, but sodium palmitate, sodium stearate, sodium linoleate, and other alkali-metal soaps of the simple fatty acid class may be used. The modified fatty acid class has been illustrated in the above examples by sulphonated castor oil, but various other modified fatty acids may be used, for example dihydroxy-stearic acid, chloro-ricinoleic acid, and acetyl-ricinoleic acid. The sulphonated fatty acids form a particularly advantageous class of modified fatty acids, for example, oleic acid hydrogen hydrogen-sulphate, hydroxy-sulpho-oleic acid, sulpho-ricinoleic acid, and the like.

In general, soaps of the simple fatty acids, such as sodium oleate, are highly efficient in reducing the residual oil content of ballast water to a low concentration provided the degree of dispersion of the oil is not too great and provided the percentage of oil in the water is not too high. On the other hand, sulphonated fatty acid soaps, for example the ammonium salts of sulphonated castor oil, are highly efficient in removing oil from ballast water when the percentage of the dispersed oil is high and when its degree of dispersion is great. However, these latter compounds, when employed under conditions favorable to effective use of simple soaps, do not produce as clean ballast water as do the simple soaps. The modified soaps, however, are effective at much lower concentrations than are the simple soaps; that is to say, whereas simple soaps under favorable conditions will deliver a ballast water containing practically no oil content, their efficiency decreases very rapidly as the quantity of soap added is decreased. On the other hand, saponified modified fatty acids, even when used in excess, will not usually deliver as clean a residual water as the simple soaps will deliver, but their effectiveness persists at much greater dilution than is the case with simple soaps. In addition, they will produce equally good results under conditions mentioned previously where simple soaps fail completely. It is our surprising discovery, however, that, if these two classes of compounds are mixed in proportions as set forth above, the resulting compound or mixture is as good as, or better than, the simple soaps in producing a high degree of clarification of the water, is better than the modified fatty acid soaps in clarifying the water when the oil is highly dispersed therein and present in high percentages, and retains these desirable properties at much greater dilutions than is possible with either component alone. On a scale in which the maximum amount of ballast water which can be effectively treated by a given quantity of simple soaps is called unity, the maximum amount treatable by the same quantity of sulphonated fatty acid soaps is about 3, while the maximum amount treatable by the same quantity of our mixture of the two types is about 6.

These results are entirely unexpected and could not have been predicted from a knowledge of the characteristics of the component materials, and constitute a material advance in the art of treating oil-contaminated ballast water. These compounds are equally effective for treating fresh water ballasts as for salt water ballasts, provided that, as mentioned above, suitable quantities of alkaline earth salts are added when treating fresh water ballasts to permit complete reaction with the saponaceous compounds. We do not completely understand the reasons for the greatly improved results obtained with our mixed compound, but believe it is due to a mutual activating or catalyzing effect of the two active components.

It is to be understood that the details of the above examples are illustrative only, and that various modifications may be employed which embody the essence of our invention and still remain within the scope of the appended claims.

We claim as our invention:

1. A composition of matter adapted to assist in the clarification by aeration of oil-in-water emulsions containing soluble alkaline earth compounds, comprising: one to five parts of an alkali-metal soap of a simple fatty acid and one to five parts of an alkali-metal soap of a saponifiable modified fatty acid, said alkali-metals including ammonium.

2. A composition of matter adapted to assist in the clarification by aeration of oil-in-water emulsion containing soluble alkaline earth compounds comprising: one to five parts of an alkali metal soap of a simple fatty acid and one to five parts of an alkali metal soap of a sulphonated fatty acid, said alkali metals including ammonia.

3. A composition as in claim 1 dissolved in a solvent comprising water and a water soluble alcohol.

4. A composition of matter adapted to assist in the clarification by aeration of oil-in-water emulsions containing soluble alkaline earth compounds, comprising: one to five parts of an alkali-metal soap of oleic acid; one to five parts of an alkali-metal soap of sulphonated castor oil; and from three to twenty-five parts of a solubilizing diluent comprising water and a water soluble alcohol.

5. A composition of matter adapted to assist in the clarification by aeration of oil-in-water emulsions containing soluble alkaline earth compounds, comprising: approximately 1 volume of sodium oleate, ½ volume of the sodium salt of sulphonated castor oil, 3½ volumes of water, and 1¼ volumes of a mixture of denatured and secondary butyl alcohols.

6. A process for treating oil-in-water emulsions, such as ballast water, comprising: adding a small amount of a mixture comprising an alkali-metal soap of a simple fatty acid and an alkali-metal soap of a saponifiable modified fatty acid; bubbling gas through the ballast water thus treated whereby the gas bubbles become associated with the dispersed oil particles and sweep the latter to the upper surface of the water to form a lower layer of clarified water and an upper oil-continuous layer; and separately removing the clarified water.

7. A process for treating oil-in-water emulsions such as ballast water, comprising: adding to the emulsion a small amount of saponaceous material comprising approximately 1 volume of sodium oleate, ½ volume of the sodium salt of sulphonated castor oil, and sufficient solubilizing diluent to make a homogeneous liquid mixture; bubbling gas through the ballast water thus treated whereby the gas bubbles become associated with the dispersed oil particles and sweep the latter to the upper surface of the water to form a lower layer of clarified water and an upper oil-continuous layer; and separately removing the clarified water.

8. A process as in claim 6, in which a soluble alkaline earth compound is added to the emulsion to supply alkaline earth ions for reaction with the soaps.

9. A process as in claim 7, in which a soluble alkaline earth compound is added to the emulsion to supply alkaline earth ions for reaction with the soaps.

CLAUDIUS H. M. ROBERTS.
RICHARD VERNON NISWANDER.